United States Patent
Iijima

(10) Patent No.: US 10,021,668 B2
(45) Date of Patent: Jul. 10, 2018

(54) WIRELESS CHARACTERISTIC DISPLAY APPARATUS, WIRELESS CHARACTERISTIC DISPLAY METHOD, AND COMPUTER READABLE MEDIUM

(71) Applicant: MITSUBISHI ELECTRIC CORPORATION, Tokyo (JP)

(72) Inventor: Shohei Iijima, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 15/551,091

(22) PCT Filed: Feb. 24, 2015

(86) PCT No.: PCT/JP2015/000907
§ 371 (c)(1),
(2) Date: Aug. 15, 2017

(87) PCT Pub. No.: WO2016/135773
PCT Pub. Date: Sep. 1, 2016

(65) Prior Publication Data
US 2018/0035401 A1    Feb. 1, 2018

(51) Int. Cl.
*H04W 64/00* (2009.01)
*H04L 12/24* (2006.01)
(Continued)

(52) U.S. Cl.
CPC ........ *H04W 64/003* (2013.01); *H04B 1/1027* (2013.01); *H04L 41/22* (2013.01); *H04W 84/18* (2013.01)

(58) Field of Classification Search
CPC .... H04W 64/003; H04W 84/18; H04L 41/22; H04B 1/1027
See application file for complete search history.

(56) References Cited

U.S. PATENT DOCUMENTS 6,286,044 B1    9/2001    Aoyama
8,290,511 B2    10/2012   Burdo et al.
(Continued)

FOREIGN PATENT DOCUMENTS

JP    2000-13868 A    1/2000
JP    2005-223633 A   8/2005
(Continued)

*Primary Examiner* — Hassan Kizou
*Assistant Examiner* — Deepa Belur
(74) *Attorney, Agent, or Firm* — Birch, Stewart, Kolasch & Birch, LLP

(57) ABSTRACT

It is an object to provide a wireless characteristic display apparatus that displays wireless characteristics at a location where a multihop wireless mesh network is to be created, the apparatus being able to reduce discrepancies between displayed characteristics and actual characteristics and being able to reduce complexity in processing to obtain wireless characteristics and in the configuration of the apparatus.
The wireless characteristic display apparatus includes a first determination unit that performs interpolation processing on the basis of reception qualities obtained by measuring a wireless transmission signal from the same wireless node at a plurality of locations, and determines a reception quality at a location other than the measurement locations; a second determination unit that determines a pair of wireless nodes capable of bidirectional inter-node communication on the basis of the reception qualities obtained by the first determination unit and information on installation locations of wireless nodes; a third determination unit that determines a second communication range corresponding to the sum of communication ranges of the pair of wireless nodes obtained by the second determination unit; and a display unit that displays installation locations of the wireless nodes constituting the pair of wireless nodes obtained by the second determination unit and the second communication range obtained by the third determination unit.

10 Claims, 12 Drawing Sheets

(51) Int. Cl.
*H04B 1/10* (2006.01)
*H04W 84/18* (2009.01)

(56) References Cited

U.S. PATENT DOCUMENTS

| | | |
|---|---|---|
| 8,526,980 B2 | 9/2013 | Ebata |
| 8,909,254 B2 | 12/2014 | Burdo et al. |
| 2007/0010259 A1* | 1/2007 | Hoffmann ............... H04B 17/23 |
| | | 455/456.1 |
| 2008/0158062 A1* | 7/2008 | Fullerton ............... G01S 5/0289 |
| | | 342/463 |
| 2009/0059814 A1 | 3/2009 | Nixon et al. |
| 2009/0239532 A1 | 9/2009 | Ebata |
| 2010/0207817 A1* | 8/2010 | Brown .................... G01S 19/04 |
| | | 342/357.44 |
| 2010/0273418 A1* | 10/2010 | Eruchimovitch ..... G01S 5/0221 |
| | | 455/41.2 |
| 2011/0081918 A1 | 4/2011 | Burdo et al. |
| 2011/0273991 A1* | 11/2011 | Dahl ..................... G01S 5/0205 |
| | | 370/241 |
| 2013/0012235 A1 | 1/2013 | Burdo et al. |
| 2014/0304383 A1 | 10/2014 | Guo et al. |
| 2016/0202341 A1* | 7/2016 | Burgess ................ G01S 5/0252 |
| | | 342/452 |
| 2016/0277130 A1* | 9/2016 | Nishioka .............. H04B 17/309 |

FOREIGN PATENT DOCUMENTS

| | | |
|---|---|---|
| JP | 2005-241296 A | 9/2005 |
| JP | 2006-352385 A | 12/2006 |
| JP | 2009-111861 A | 5/2009 |
| JP | 2009-111976 A | 5/2009 |
| JP | 2009-218913 A | 9/2009 |
| JP | 2011-71599 | 4/2011 |
| JP | 2012-244208 A | 12/2012 |
| JP | 2013-54402 A | 3/2013 |
| JP | 2013-76242 A | 4/2013 |
| JP | 2013-121063 A | 6/2013 |
| JP | 2014-150536 A | 8/2014 |
| JP | 2014-151107 A | 8/2014 |

\* cited by examiner (a)

(b)

(a)

(b)

WIRELESS CHARACTERISTIC DISPLAY APPARATUS, WIRELESS CHARACTERISTIC DISPLAY METHOD, AND COMPUTER READABLE MEDIUM

TECHNICAL FIELD

The present invention relates generally to a display apparatus, and relates particularly to a display apparatus for wireless communication.

BACKGROUND ART

In a wireless M2M system (Machine to Machine System; for example, a metering system and a remote management system) for which an increase in demand is predicted in the future, the use of a multihop wireless mesh network using a routing protocol, most notably RPL (IPv6 Routing Protocol for Low Power and Lossy Networks), is expected.

The multihop wireless mesh network allows each wireless node constituting the network to transfer data in a bucket brigade manner. Thus, compared to a star network centered at one base station, (1) a range in which communication is possible can be enlarged, and (2) the network can be configured such that a diverted route for transfer is created if a certain wireless node or wireless communication path becomes unusable, thereby allowing the reliability of communication to be improved.

On the other hand, compared to the star network, consideration work and testing work become complex with regard to various items necessary for consideration when the network is designed or devices are installed, such as (1) possibility of communication between wireless nodes, (2) a range in which communication as the wireless network is possible, (3) an installation location of a relay wireless node to be installed in order to enable communication if communication between wireless nodes is not possible, and (4) an installation location of a wireless node to be installed in order to increase the number of communication paths in the wireless network (or redundancy of the wireless network), for example.

Therefore, in order to perform the above-described work efficiently, it is desired that the items related to wireless characteristics as described above be displayed for the user who creates the network in a manner that facilitates visual perception.

As a technique for such display regarding wireless characteristics, there is known a technique of displaying icons and communication ranges of devices that perform wireless communication on an electronic map (Patent Literature 1 and Patent Literature 2).

In a device map display apparatus described in Patent Literature 1, device installation information is acquired from a management center which is a component of a network that is operating, and icons displayed to indicate devices are changed according to the scale of an electronic map, and also the communication status between devices that perform wireless communication is displayed with a line, thereby allowing the actual communication status to be perceived. Moreover, a range of reach of radio waves transmitted from each device can be displayed.

In a wireless relay device support apparatus described in Patent Literature 2, a communication range of each device is obtained by simulation using various databases such as a database of wireless characteristics of individual relay devices, so as to predict and display a candidate location for installing a relay device (a utility pole, etc.).

CITATION LIST

Patent Literature

Patent Literature 1: JP 2012-244208 A
Patent Literature 2: JP 2013-121063A

SUMMARY OF INVENTION

Technical Problem

However, the device map display apparatus of Patent Literature 1 uses a circle to display the shape of a distance of reach (range of reach) of radio waves transmitted from each device, with regard to each device to be displayed (see FIG. 9 of Patent Literature 1). This requires a small amount of processing time and processing energy for displaying the distance of reach (range of reach). However, the propagation status of radio waves (wireless signals) at the actual installation location is not reflected, so that it is merely display as a simplified rough indication, and there is a large difference between the display and in practice. Therefore, when the device is actually installed, adjustment work becomes difficult, or on-site testing work regarding wireless characteristics is separately required.

Moreover, in order to display the configuration of the network, it is necessary to collect information on the communication status between devices from the devices in the network that have actually performed communication.

The wireless relay device installation support apparatus of Patent Literature 2 predicts the communication range by simulation using various databases, so that various types of processing for the display and the configuration of the apparatus become complex, and processing time and processing energy for the display increase compared with Patent Literature 1.

Moreover, since the distance of reach (range of reach) of radio waves is obtained by simulation, a detailed shape of the distance of reach (range of reach) can be estimated. However, it is not the propagation status of radio waves (wireless signals) at the actual installation location. Thus, problems are that on-site testing work regarding wireless characteristics is separately required, and that the amount of testing work increases because the shape that can be obtained is detailed.

In view of the above-described problems, it is an object of the present invention to provide a wireless characteristic display apparatus that can reduce discrepancies between displayed wireless characteristics and actual wireless characteristics, with regard to wireless characteristics at a location where a multihop wireless mesh network is created. It is another object to provide a wireless characteristic display apparatus that can reduce complexity in processing to obtain wireless characteristics and in the configuration of the apparatus.

Solution to Problem

A wireless characteristic display apparatus according to the present invention includes:

a first determination unit to perform interpolation processing using reception qualities of a wireless transmission signal from a same wireless node measured at a plurality of measurement locations, and determine a reception quality of the wireless transmission signal at a location other than the measurement locations;

a second determination unit to determine, on a basis of the reception quality of the wireless transmission signal at the location other than the measurement locations determined by the first determination unit and information on installation locations of a plurality of wireless nodes, a pair of wireless nodes included in the plurality of wireless nodes and capable of bidirectional inter-node communication;

a third determination unit to determine a second communication range corresponding to a sum of communication ranges of the wireless nodes constituting the pair of wireless nodes capable of bidirectional inter-node communication determined by the second determination unit; and a display unit to display installation locations of the wireless nodes constituting the pair of wireless nodes capable of bidirectional inter-node communication determined by the second determination unit and the second communication range determined by the third determination unit.

Advantageous Effects of Invention

According to a wireless characteristic display apparatus of the present invention, the apparatus is configured to use actual measurement data so as to analyze and display wireless characteristics, so that discrepancies between displayed wireless characteristics and actual wireless characteristics can be reduced.

Moreover, data at a location other than measurement locations is obtained on the basis of the actual measurement data so as to supplement data required for display, so that it is possible to reduce complexity in processing to obtain wireless characteristics and in the configuration of the apparatus.

DESCRIPTION OF EMBODIMENTS

Figure 1:
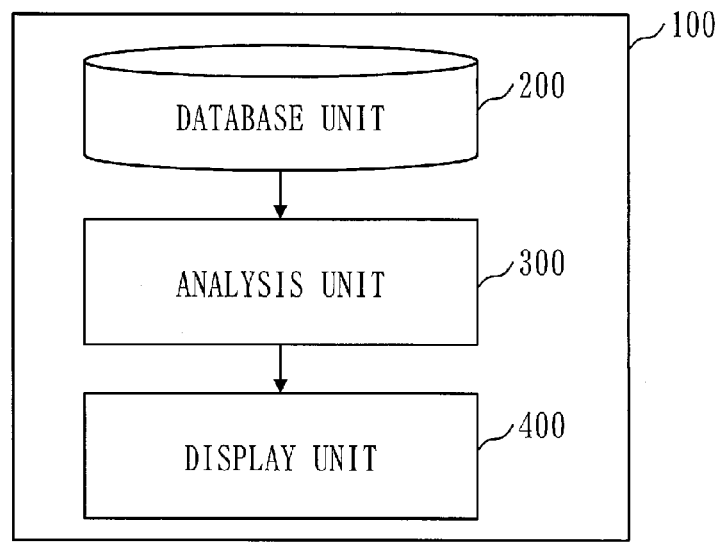
FIG. 1 is a diagram illustrating an overview of a wireless characteristic display apparatus according to a first embodiment of the present invention.

Embodiments of the present invention will be described hereinafter with reference to the drawings.

In the drawings of the following embodiments, the same or substantially the same reference numerals are given to the same or substantially the same components, and description and explanation thereof may be omitted in the description of the embodiments.

Elements and blocks in the drawings are divided for the convenience of description of the present invention, and the implementation arrangement thereof is not limited to the configurations, divisions, names, and the like in the drawings. How divisions are made and the interrelationship of divided parts are also not limited to those in the drawings.

In the following description, in order to facilitate understanding of the description, the terms "input" and "output" are used to describe exchange of information and the like between elements or blocks for the sake of convenience.

In the following description, some or all of the names " . . . unit" may be replaced by other names such as, for example, " . . . means", " . . . device", " . . . processing apparatus", " . . . functional unit", and " . . . circuit", and each name is not limited to " . . . unit". Some or all of the names " . . . unit" may also be replaced by " . . . processing" and " . . . step", each of which then may be understood as representing a processing flow regarding each replaced element or block.

First Embodiment

A first embodiment of the present invention will be described hereinafter with reference to FIG. 1 to FIG. 5.

FIG. 1 is a diagram illustrating an overview of a wireless characteristic display apparatus according to the first embodiment of the present invention.

In FIG. 1, 100 indicates the wireless characteristic display apparatus, 200 indicates a database unit, 300 indicates an analysis unit, and 400 indicates a display unit.

In the implementation of the wireless characteristic display apparatus 100, it is possible to define various wireless characteristic display apparatuses in a broad sense including a component or a function not illustrated. For example, it is possible to include some or all of (1) various control circuits, (2) various information processing circuits, (3) a communication circuit, (4) a power supply circuit, (5) various interface circuits, (6) other circuits that use results of analysis, (7) a housing, and (8) moving means.

The database unit 200 stores various types of data and information. The database unit 200 outputs the various types of data and information that are accumulated to the analysis unit 300. The various types of data and information are stored by a method selected in accordance with the implementation of the wireless characteristic display apparatus 100 from various methods exemplified by (1) a method in which the various types of data and information are input from the outside of the wireless characteristic display apparatus 100 and are stored, (2) a method in which the various types of data and information are generated internally and are stored, and (3) a method in which the various types of data and information are pre-stored in another storage device and the entirety of this storage device is incorporated into the wireless characteristic display apparatus 100 when the wireless characteristic display apparatus 100 is manufactured.

The various types of data or information in the database unit 200 include data of reception qualities obtained by measuring a wireless transmission signal from the same wireless node at a plurality of measurement locations (for example, see #1 to #4 in FIG. 3 to be described later).

The analysis unit 300 receives as input the various types of data and information from the database unit 200. The analysis unit 300 determines a wireless characteristic on the basis of the various types of data and information that have been input. The analysis unit 300 outputs the determined result to the display unit 400.

Figure 3:
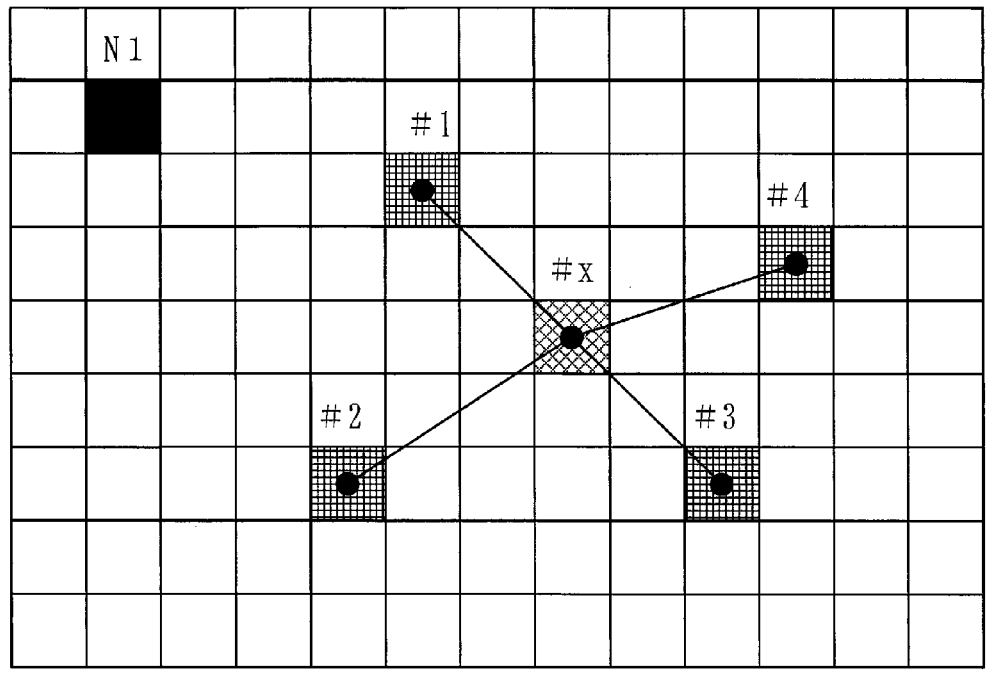
FIG. 3 is a diagram illustrating a method for estimating a reception quality according to the first embodiment of the present invention.

Specifically, for example, the analysis unit 300 first performs interpolation processing using reception qualities obtained by measuring a wireless transmission signal from the same wireless node at a plurality of measurement locations, so as to estimate a reception quality at a location other than the measurement locations (for example, see #x in FIG. 3). By this, the number of pieces of reception quality data is supplemented in accordance with the size of an area necessary for various types of display.

Then, on the basis of the reception quality at the location other than the measurement locations described above and information on installation locations of a plurality of wireless nodes, the analysis unit 300 determines a pair of wireless nodes included in the plurality of wireless nodes and capable of bidirectional inter-node communication within the pair (hereinafter described as a pair of wireless nodes capable of bidirectional inter-node communication).

Further, the analysis unit 300 determines a communication range corresponding to the sum of communication ranges of the wireless nodes constituting the pair of wireless nodes capable of bidirectional inter-node communication (a second communication range).

Further, the analysis unit 300 outputs the determined results to the display unit 400. The analysis unit 300 outputs the input data and information to the display unit 400 as necessary.

A specific example and operation of the analysis unit 300 will be described later.

The display unit 400 displays the results of analysis obtained by the analysis unit 300. In the implementation of the display unit 400, it may be configured such that data and information other than the results of analysis can be displayed simultaneously or alternately. For example, it may be configured such that various types of data stored in the database unit 200 and wireless characteristics are displayed simultaneously.

Specifically, for example, the display unit 400 displays (1) the installation locations of the wireless nodes constituting the pair of wireless nodes capable of bidirectional inter-node communication and (2) the second communication range. As a display method, one or all of (1) a line, (2) a contour line, and (3) a heat map can be used, for example, depending on the implementation arrangement of the wireless characteristic display apparatus 100.

A specific example of display in the display unit 400 will be described later.

Figure 2:
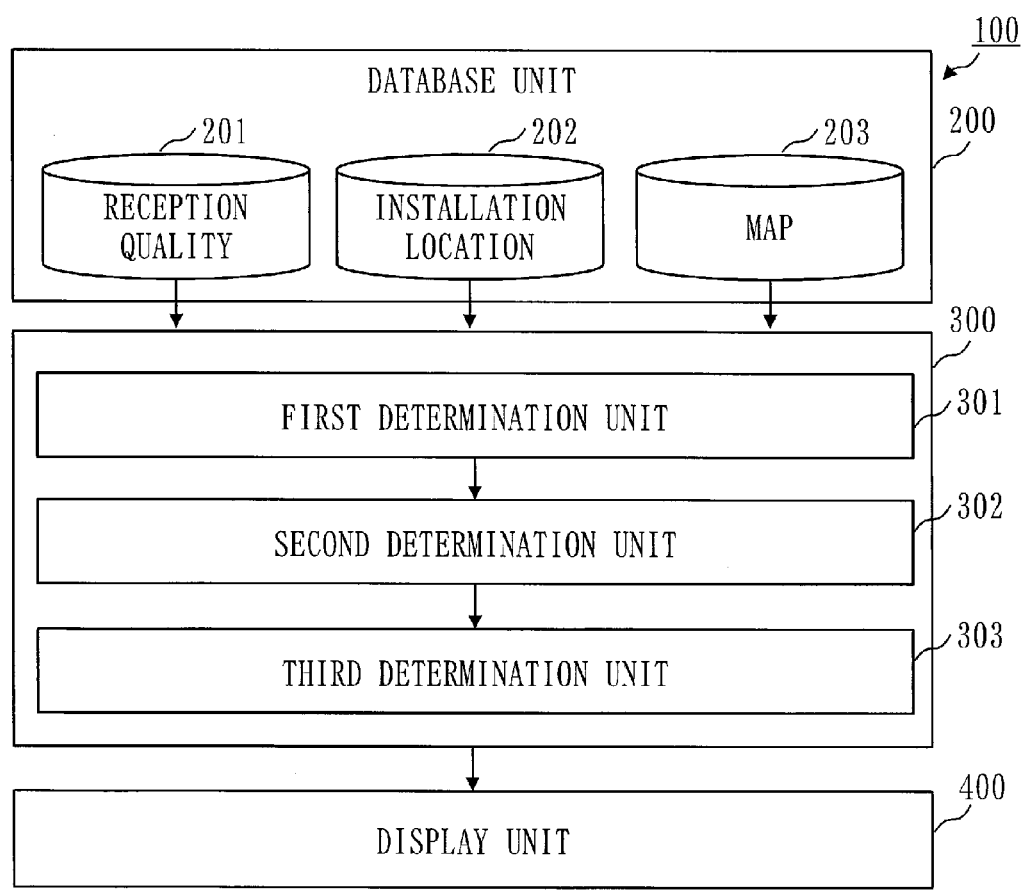
FIG. 2 is a diagram illustrating an overview of an internal configuration of the wireless characteristic display apparatus according to the first embodiment of the present invention.

FIG. 2 is a diagram illustrating an overview of an internal configuration of the wireless characteristic display apparatus according to the first embodiment of the present invention. FIG. 2 is an example where the internal configuration of the apparatus of FIG. 1 is illustrated more specifically.

In FIG. 2, 100 indicates the wireless characteristic display apparatus, 200 indicates the database unit, 201 indicates a reception quality database, 202 indicates an installation location database, 203 indicates a map information database, 300 indicates the analysis unit, 301 indicates a first determination unit, 302 indicates a second determination unit, 303 indicates a third determination unit, and 400 indicates the display unit.

The database unit 200 has the reception quality database 201, the installation location database 202, and the map information database 203.

The reception quality database 201 stores information on a reception quality measurement location, information to indicate an identifier of a wireless node for which measurement is performed, and information on a measured reception quality in association with one another. The reception quality database 201 outputs the stored information to the first determination unit 301.

The installation location database 202 stores information on an installation location of a wireless node and information to indicate an identifier of the wireless node in association with each other. The installation location database 202 outputs the stored information to the first determination unit 301. The information on the installation location of the wireless node may include the information to indicate the identifier of the wireless node.

The map information database 203 stores various types of map information required for analysis in the analysis unit 300 and display in the display unit 400. The map information database 203 outputs the stored information to the first determination unit 301.

This embodiment will be described using an example where the information to be stored in the reception quality database 201, the information to be stored in the installation location database 202, and the information to be stored in the map information database 203 are pre-stored in the respective databases.

Various display formats can be applied as a display format of the reception quality measurement locations, the installation locations of the wireless nodes, and positions used in the map information. For example, a format using latitude and longitude can be used. It is not limited to using the same display format, as long as each format allows association or conversion within each database and between databases.

The analysis unit 300 has the first determination unit 301, the second determination unit 302, and the third determination unit 303.

The first determination unit 301 receives as input the reception quality information stored in the reception quality database 201 and the map information stored in the map information database 203. On the basis of the input reception quality information and map information, the first determination unit 301 estimates a reception quality at a location other than the measurement locations so as to supplement the number of pieces of reception quality data in accordance with, for example, a degree of accuracy or the like required for various types of display. The first determination unit 301 outputs the reception quality information input from the reception quality database 201 and the information on the estimated reception quality to the second determination unit 302.

The second determination unit 302 receives as input the reception quality information output from the first determination unit 301 and the information on the installation locations of the wireless nodes stored in the installation location database 202. The second determination unit 302 determines a pair of wireless nodes included in the installed wireless nodes and capable of bidirectional inter-node communication, on the basis of the input reception quality information and the map information stored in the map information database 203. The second determination unit 302 outputs the information on the determined pair of wireless nodes to the third determination unit 303.

The third determination unit 303 determines a second communication range for the pair of wireless nodes determined by the second determination unit 302. The third determination unit 303 outputs the information on the determined second communication range to the display unit 400.

The operation of the analysis unit 300 will now be described.

This embodiment will be described using an example where received electric power is used as a parameter to indicate a reception quality. Note that another parameter may be used, provided that the parameter corresponds to the intensity of radio waves (what is known as radio field intensity) at the measurement location of a wireless transmission signal propagated as radio waves.

First, the first determination unit 301 receives as input the reception quality information and the map information from the database unit 200.

The first determination unit 301 determines a distance between a location where a reception quality is to be estimated (i.e., a location other than measurement locations) and each of a plurality of measurement locations existing around the location where a reception quality is to be estimated.

Then, the first determination unit 301 determines weighting coefficients on the basis of the determined distances.

Then, the first determination unit 301 performs weighted average processing using the determined weighting coefficients and the reception qualities at the measurement locations, so as to estimate the reception quality at the location other than the measurement locations.

FIG. 3 is a diagram illustrating a method for estimating a reception quality according to the first embodiment of the present invention.

In FIG. 3, grid representation indicates blocks representing divided areas of a place of the range to be analyzed (or to be displayed), #1 to #4 (and corresponding shaded blocks) indicate measurement locations, #x (and a corresponding shaded block) indicates a location at which a reception quality is estimated, N1 indicates an identifier of a wireless node, a filled block indicates a block that includes an installation location of a wireless node, a filled circle indicates a block that includes a measurement location, and a line connecting filled circles indicates that the measurement point is used for estimation at the location #x.

In FIG. 3, in order to simplify description, the case in which a wireless transmission signal from a given wireless node is measured at four measurement locations will be described. However, the number of wireless nodes and the number of measurement points used for estimation are not limited to those in FIG. 3. Note that it is desirable that the number of measurement points used for estimation at one location #x be four or more.

In the case of FIG. 3, a distance between the location #x at which a reception quality is estimated and each of the measurement locations #1 to #4 existing around the location #x is determined first.

The reception quality is estimated by weighting, in accordance with the distance to each measurement point, the received electric power at each of the measurement points (#1 to #4) in proximity of the location #x in a plurality of directions as seen from the location #x, and then calculating the average. For example, a value proportional to one divided by the distance to the power of n is used as a weighting coefficient.

In the implementation of the wireless characteristic display apparatus 100, various methods for specification can be applied for a parameter to specify in what range of measurement points have their reception qualities used for the estimation with regard to one location #x. For example, it can be implemented using one or more of (1) a fixed value, (2) a variable, (3) an optimum value obtained by on-site testing or the like, and (4) a value selected by the user of the wireless characteristic display apparatus 100.

Reception qualities are estimated in substantially the same manner as described above also at other blocks (unfilled blocks) other than the blocks corresponding to the measurement locations in FIG. 3. If another wireless node is installed, reception qualities are estimated in substantially the same manner also with regard to that wireless node.

If the conditions required for estimation are not available or if it is assumed that deterioration in the accuracy of estimation is allowed for some blocks, such as, for example, if the number of neighboring measurement locations for a given location #x is insufficient, processing to be performed in such a case depends on the implementation arrangement of the wireless characteristic display apparatus 100. For example, it may be implemented using one or both of (1) it is determined that no estimation results are available and (2) estimation is performed on the basis of the available number of measurement locations.

Then, the second determination unit 302 sets a threshold for determining a pair of wireless nodes capable of bidirectional inter-node communication.

In the implementation of the wireless characteristic display apparatus 100, various methods can be applied for specifying the threshold. For example, one or more of (1) a fixed value, (2) a variable, (3) an optimum value obtained by on-site testing or the like, and (4) a value selected by the user of the wireless characteristic display apparatus 100 can be applied.

Then, the second determination unit 302 determines a pair of wireless nodes capable of bidirectional inter-node communication, on the basis of the threshold that has been set.

Note that one pair or a plurality of pairs may be determined. One of the wireless nodes constituting one pair may also be one of the wireless nodes constituting another pair.

Figure 4:
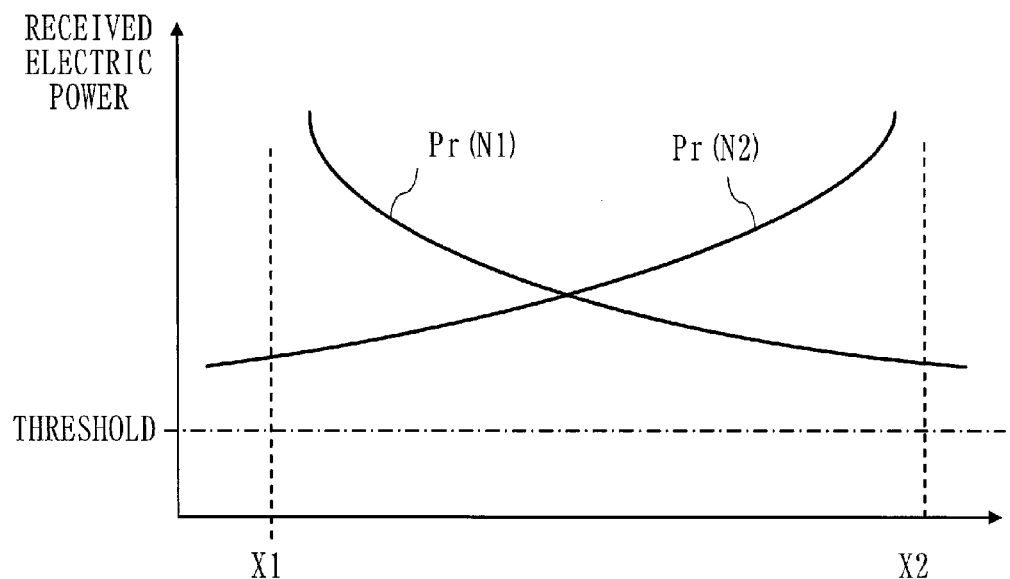
FIG. 4 is a diagram illustrating a method for determining a pair of wireless nodes according to the first embodiment of the present invention.

FIG. 4 is a diagram illustrating a method for determining a pair of wireless nodes according to the first embodiment of the present invention.

In FIG. 4, the vertical axis indicates received electric power, the horizontal axis indicates a position, N1 and N2 each indicate an identifier of a wireless node, X1 indicates an installation location of the wireless node N1, X2 indicates an installation location of the wireless node N2, Pr (N1) indicates change in the received electric power with regard to the wireless node N1, and Pr (N2) indicates change in the received electric power with regard to the wireless node N2.

As illustrated in FIG. 4, a pair of wireless nodes is determined by assuming a certain pair of wireless nodes and on the basis of the value of the received electric power Pr (N2) at the installation location X1, the value of the received electric power Pr (N1) at the installation location X2, and the threshold.

Specifically, for example, this is performed by using, in the implementation of the wireless characteristic display apparatus 100, one of (1) lower one of the values of the received electric power Pr (N2) and Pr (N1) and (2) the average value of the received electric power Pr (N2) and Pr (N1), and checking whether the values at the installation locations of both of the wireless nodes are higher than or equal to the threshold.

Then, the third determination unit 303 determines a range corresponding to the sum of the communication ranges of the wireless nodes included in the pair determined by the second determination unit 302 (a second communication range), on the basis of the reception quality information obtained by the first determination unit 301 and the information on the pair of wireless nodes determined by the second determination unit 302.

The third determination unit 303 outputs the information on the installation locations of the wireless nodes included in the pair determined by the second determination unit 302 and the information on the second communication range to the display unit 400.

Figure 5:
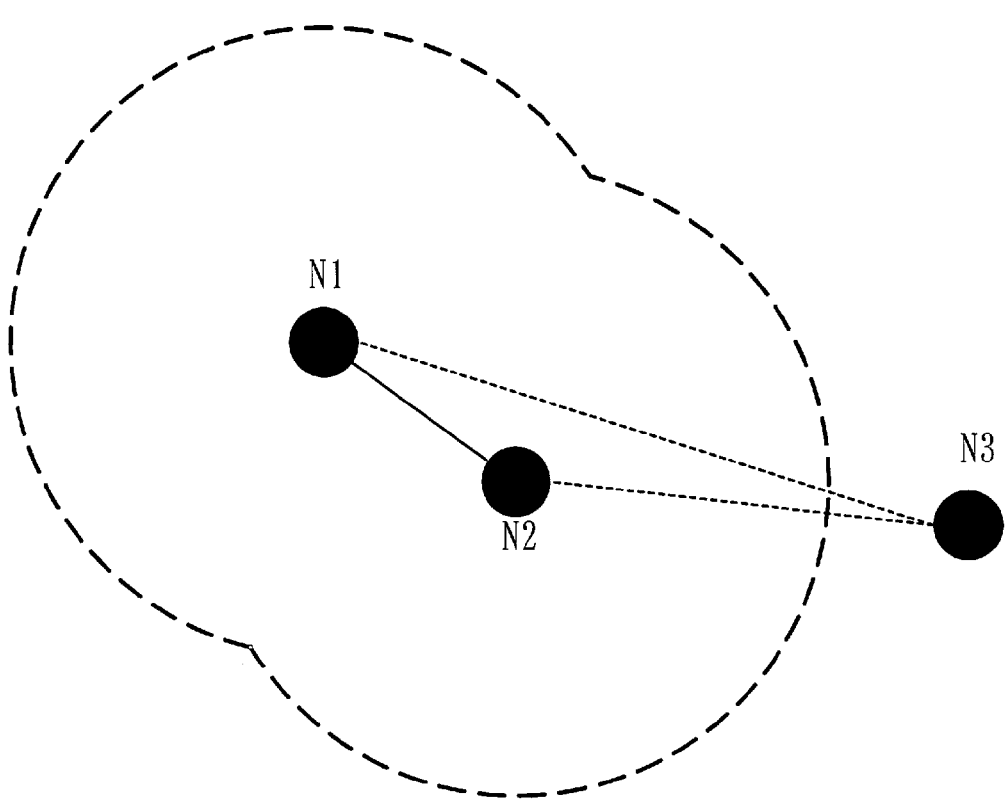
FIG. 5 is a diagram illustrating an example of display in a display unit according to the first embodiment of the present invention.

FIG. 5 is a diagram illustrating an example of display in the display unit according to the first embodiment of the present invention.

In FIG. 5, N1 to N3 each indicate an identifier of a wireless node, a filled circle is an icon representing an installation location of a wireless node (a representative point) or representing a wireless node, a straight line (solid line) indicates that bidirectional inter-node communication is possible, a straight line (dashed line) indicates that bidirectional inter-node communication is not possible, and a curved line (dashed line) indicates a second communication range. For ease of understanding, the case in which the communication range of each wireless node is a simple circular range is used as an example.

FIG. 5 illustrates an example where installation locations of three wireless nodes are included in the range displayed in the display unit 400. Note that the number of wireless nodes to be displayed is not limited to three. In the case of FIG. 5, it can be seen that the pair of the first wireless node N1 and the second wireless node N2 is a pair capable of bidirectional inter-node communication, and the range which is the sum of the communication ranges of N1 and N2 is displayed as the second communication range. In the case of FIG. 5, it can be seen that a pair capable of bidirectional inter-node communication cannot be formed with regard to the third wireless node N3.

As described above, according to the wireless characteristic display apparatus of this embodiment, actual measurement data is used to analyze and display wireless characteristics, so that discrepancies between displayed wireless characteristics and actual wireless characteristics can be reduced. The number of pieces of reception quality data at locations other than the measurement locations is supplemented on the basis of the actual measurement data, so that complexity in processing to obtain wireless characteristics and in the configuration of the apparatus can be reduced.

Moreover, reception qualities at locations other than the measurement locations are estimated, so that the number of pieces of measurement data required for display in the display unit 400 can be reduced, and the number of pieces of reception quality measurement data that are required in advance can be reduced.

Moreover, when on-site testing is performed with regard to the displayed wireless characteristics, reception qualities that have been actually measured can be used as reference data, so that differences between the display and the testing can be easily perceived, and the number of pieces of measurement data at the testing can be reduced.

Moreover, whether bidirectional communication is possible can be determined with regard to a combination of two wireless nodes installed at locations where no measurement has been performed.

Moreover, the range in which communication as a network can be performed is displayed, so that it is possible to check the range in which communication including communication via a relay node can be performed.

Moreover, the communication range limited to the communication range of wireless nodes with which a network can be configured (i.e., the second communication range) can be displayed in a manner that facilitates visual perception.

In this embodiment, as illustrated in FIG. 3, the case in which the installation locations of the wireless nodes are not included in the measurement locations (#1 to #4) has been described. Some of the installation locations of the wireless nodes may be included in the measurement locations.

This embodiment has been described using an example where results of determination in the analysis unit 300 are mainly displayed. However, the wireless characteristic display apparatus may be configured to also display the map information, and the configuration and operation are not limited to those illustrated in the drawings.

In this embodiment, as illustrated in FIG. 2, the case in which each database in the database unit 200 stores information independently has been described. However, the configuration is not limited to that in FIG. 2. Various modifications are possible according to the implementation arrangement of the wireless characteristic display apparatus 100, such as (1) related or corresponding pieces of information are stored as a group across databases, and (2) relations among related or corresponding pieces of information are provided as another database.

In this embodiment, in the description of FIG. 4, it is described that "a pair of wireless nodes capable of bidirectional inter-node communication is determined". In the implementation of the wireless characteristic display apparatus, various methods for determination can be applied, and it is not limited to the above description of FIG. 4. For example, it can be implemented by applying one or both of (1) a method in which whether or not a pair of wireless nodes is a pair capable of bidirectional inter-node communication is determined, and (2) a method in which a pair of wireless nodes incapable of bidirectional inter-node communication is determined and pairs excluding the pair incapable of bidirectional inter-node communication are displayed.

In this embodiment, as illustrated in FIG. 3, the case in which divisions are made into blocks in a grid pattern for estimating reception qualities has been described. However, as long as a division format can cover the entirety of the range to be displayed or to be analyzed, the division format is not limited to the grid pattern. For example, divisions may be made in accordance with the shape of a road using the map information. The size that defines each block is not limited to a uniform size.

The above-described various modifications in this embodiment can also be applied in substantially the same manner to the embodiments to be described later.

Second Embodiment

A second embodiment of the present invention will be described hereinafter with reference to FIG. 6 to FIG. 8. With regard to the components and operation that are substantially the same as those in the first embodiment above, description thereof may be omitted.

Figure 6:
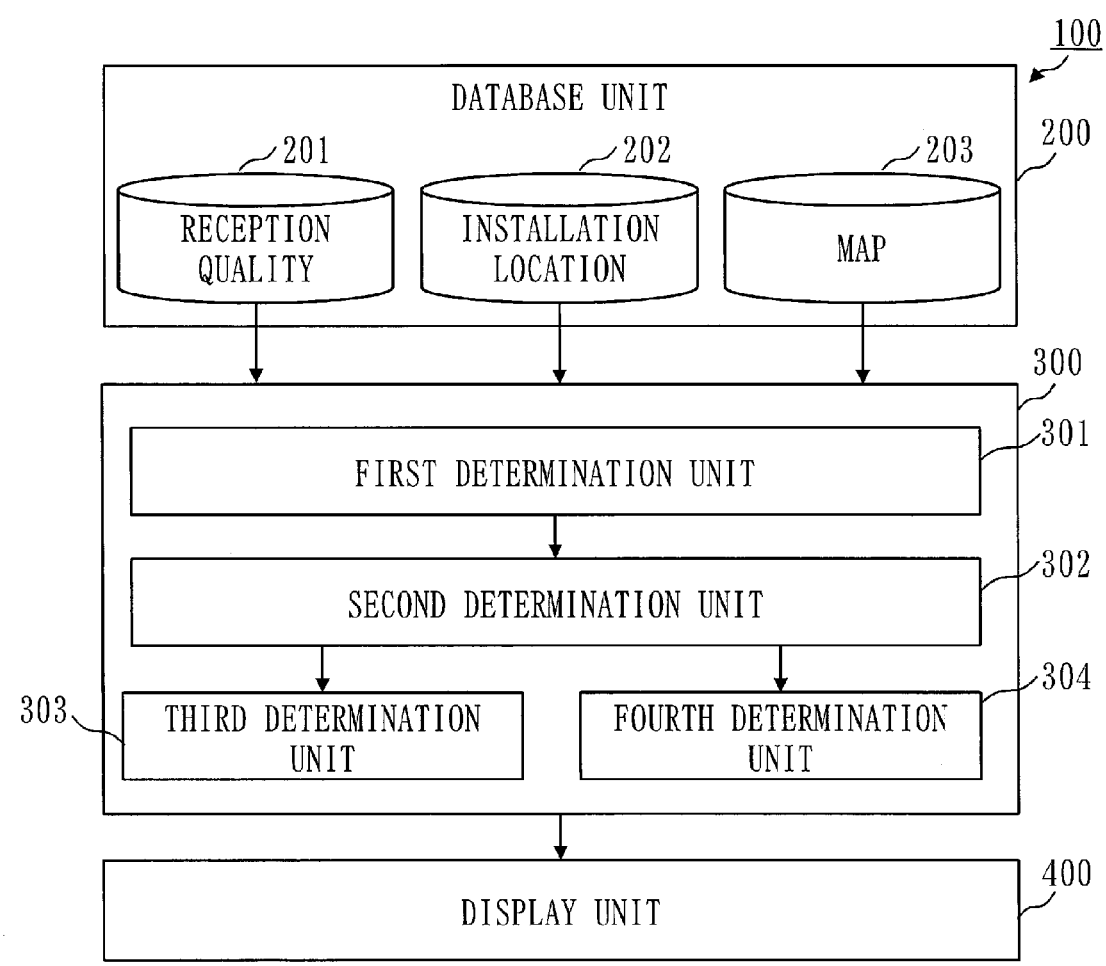
FIG. 6 is a diagram illustrating an overview of an internal configuration of a wireless characteristic display apparatus according to a second embodiment of the present invention.

FIG. 6 is a diagram illustrating an overview of an internal configuration of a wireless characteristic display apparatus according to the second embodiment of the present invention. In FIG. 6, 304 indicates a fourth determination unit. The rest of the components are substantially the same as those in the first embodiment above.

This embodiment differs from the first embodiment above mainly in that the fourth determination unit 304 is included.

A second determination unit 302 outputs information on a pair of wireless nodes capable of bidirectional inter-node communication also to the fourth determination unit 304.

The fourth determination unit 304 receives as input the information on the pair of wireless nodes capable of bidirectional inter-node communication from the second determination unit 302. The fourth determination unit 304 determines a wireless communication path that may be used as a communication path of a multihop wireless mesh network, on the basis of the information on the pair of wireless nodes capable of bidirectional inter-node communication. The fourth determination unit 304 outputs information on the determined wireless communication path to a display unit 400.

The display unit 400 receives as input the information on the determined wireless communication path from the fourth determination unit 304. The display unit 400 displays the configuration of the network on the basis of the information on the wireless communication path.

The operation of the rest of the components is substantially the same as that in the first embodiment above, and thus description will be omitted.

Various known or new network creation algorithms can be applied for determining a wireless communication path in the fourth determination unit 304. As an index used for determination, one or more of (1) the number of paths, (2) reception quality, and (3) communication quality can be applied, for example.

Figure 7:
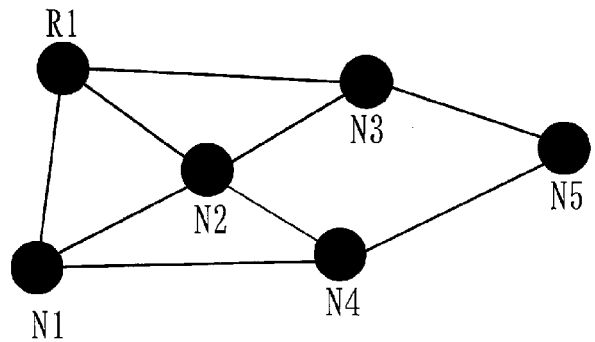
FIG. 7 is a diagram illustrating an example of display in a display unit according to the second embodiment of the present invention.
Figure 8:
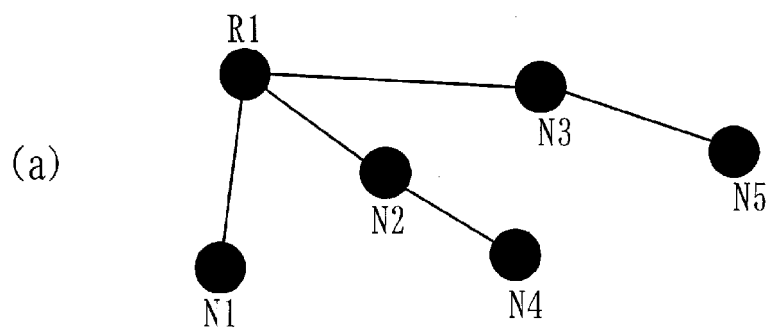
FIG. 8 is a diagram illustrating an example of display in the display unit according to the second embodiment of the present invention.
Figure 8:
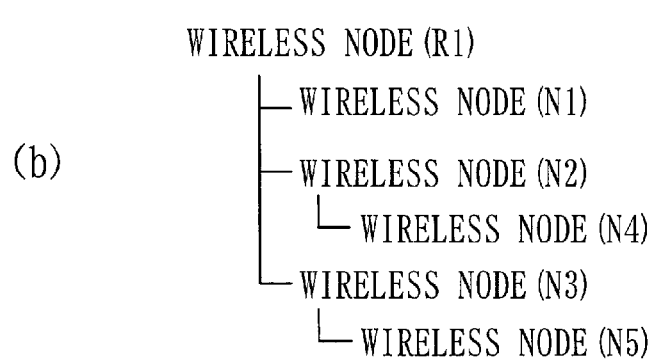

FIG. 7 and FIG. 8 are diagrams each illustrating an example of display in the display unit according to the second embodiment of the present invention.

In FIG. 7 and FIG. 8, N1 to N5 and R1 each indicate an identifier of a wireless node, a filled circle is an icon representing an installation location of a wireless node (a representative point) or representing a wireless node, and a straight line (solid line) indicates a path that may be used as a communication path.

FIG. 7 illustrates an example where all links of wireless nodes, including diverted paths, that may be used as communication paths between the wireless node R1 of interest and other wireless nodes are formed.

(a) of FIG. 8 illustrates an example configured by a network creation algorithm for tree-type multihop wireless mesh networks.

(b) of FIG. 8 illustrates an example where (a) of FIG. 8 is displayed in a tree format.

As described above, the wireless characteristic display apparatus of the present embodiment provides substantially the same effects as those of the first embodiment above.

Moreover, the fourth determination unit 304 is included, so that it is possible to easily perceive the configuration of the network having paths that may be used as communication paths, in addition to the display items in the first embodiment.

Moreover, the configuration of the network can be displayed, and this has the effect of being able to predict a communication delay when the network is designed. The delay may be predicted artificially on the basis of the display in the display unit 400, or by an existing or new delay estimation circuit which may be included in the wireless characteristic display apparatus 100.

With regard to substantially the same configuration and operation as those in the first embodiment above, modifications that are substantially the same as the various modifications described in the first embodiment above can be applied.

By changing the index for determination (for example, a threshold) described above and checking change in the displayed configuration of the network, configuration-related problems in the network that are expected can be examined.

The configuration of this embodiment has been described above as the configuration including all of the first determination unit 301 to the fourth determination unit 304. The wireless characteristic display apparatus 100 may be implemented independently of the third determination unit 303 and the fourth determination unit 304, and the wireless characteristic display apparatus 100 in a narrow sense not including one of these units may be configured.

Third Embodiment

A third embodiment of the present invention will be described hereinafter with reference to FIG. 9 and FIG. 10.

With regard to the same or substantially the same components as the components of the first embodiment above and operation thereof, description thereof may be omitted.

Figure 9:
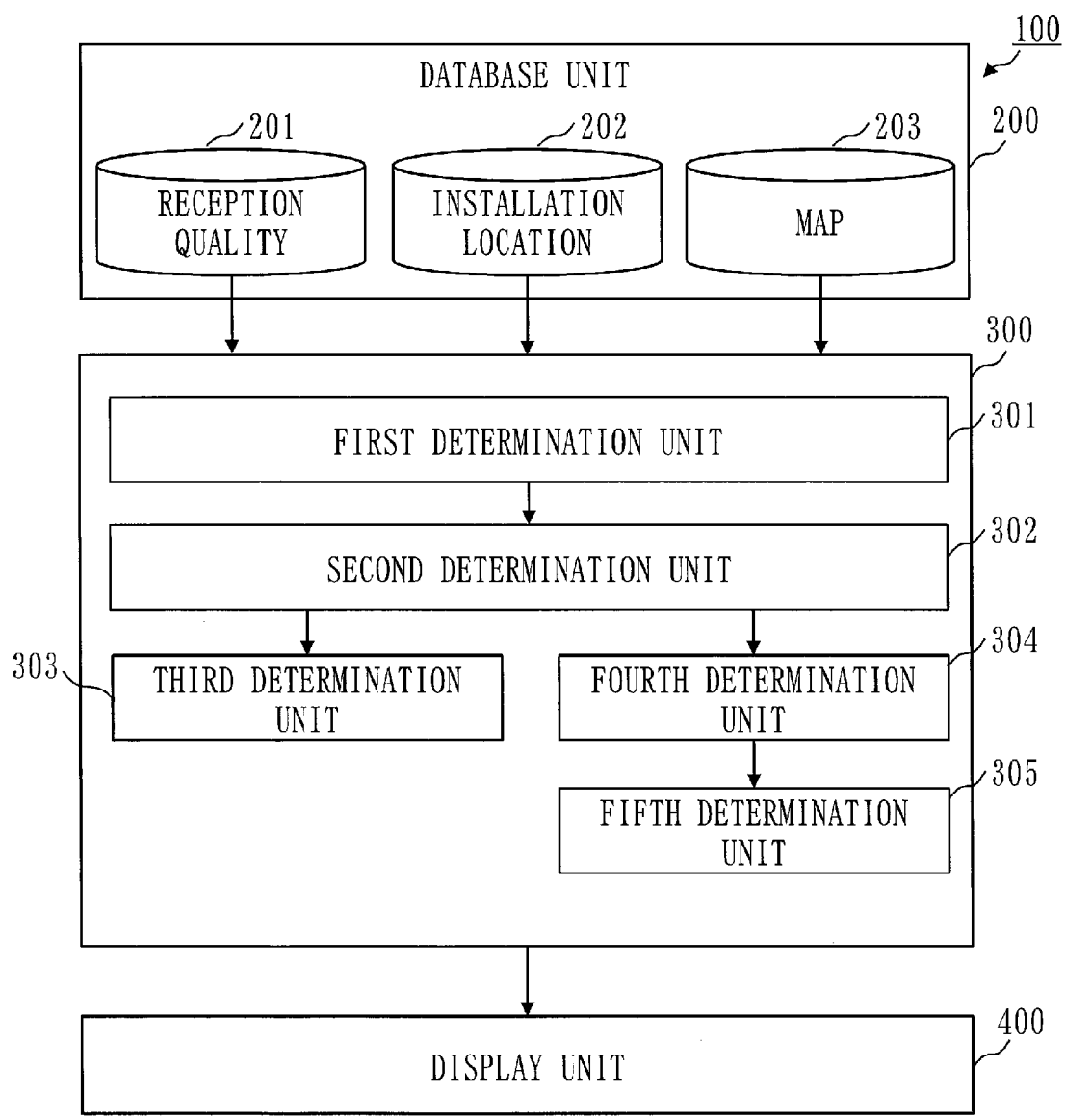
FIG. 9 is a diagram illustrating an overview of an internal configuration of a wireless characteristic display apparatus according to a third embodiment of the present invention.

FIG. 9 is a diagram illustrating an overview of an internal configuration of a wireless characteristic display apparatus according to the third embodiment of the present invention. In FIG. 9, 305 indicates a fifth determination unit. The rest of the components are substantially the same as those of the second embodiment above.

This embodiment differs from the second embodiment above mainly in that the fifth determination unit 305 is included.

A fourth determination unit 304 outputs information on a determined wireless communication path to the fifth determination unit 305.

The fifth determination unit 305 receives as input the information on the wireless communication path from the fourth determination unit 304. The fifth determination unit 305 determines a communication quality of bidirectional inter-node communication with regard to each pair of wireless nodes constituting the wireless communication path determined by the fourth determination unit 304, and classifies the communication quality. Specifically, the fifth determination unit 305 determines the communication quality of bidirectional inter-node communication with regard to each pair of wireless nodes constituting the wireless communication path determined by the fourth determination unit 304 and classifies the communication quality, on the basis of the information on the wireless communication path from the fourth determination unit 304 and reception quality information of each pair from a first determination unit 301. The fifth determination unit 305 outputs the information on the wireless communication path and the information on the communication quality to a display unit 400.

For the communication quality, various known indexes exemplified, for example, by (1) a transfer error rate and (2) transfer delay time can be applied.

When displaying the configuration of the network as disclosed in the second embodiment above, the display unit 400 also displays the communication quality of each pair of wireless nodes determined by the fifth determination unit 305.

The rest of the operation is substantially the same as that in the second embodiment above, and thus description thereof will be omitted.

Various known methods for determination can be applied for the determination of a communication quality in the fifth determination unit 305. For example, information on the "transfer error rate—received electric power" characteristic with regard to communication between wireless nodes may be pre-stored in the wireless characteristic display apparatus 100, and the communication quality may be determined on the basis of that characteristic.

Figure 10:
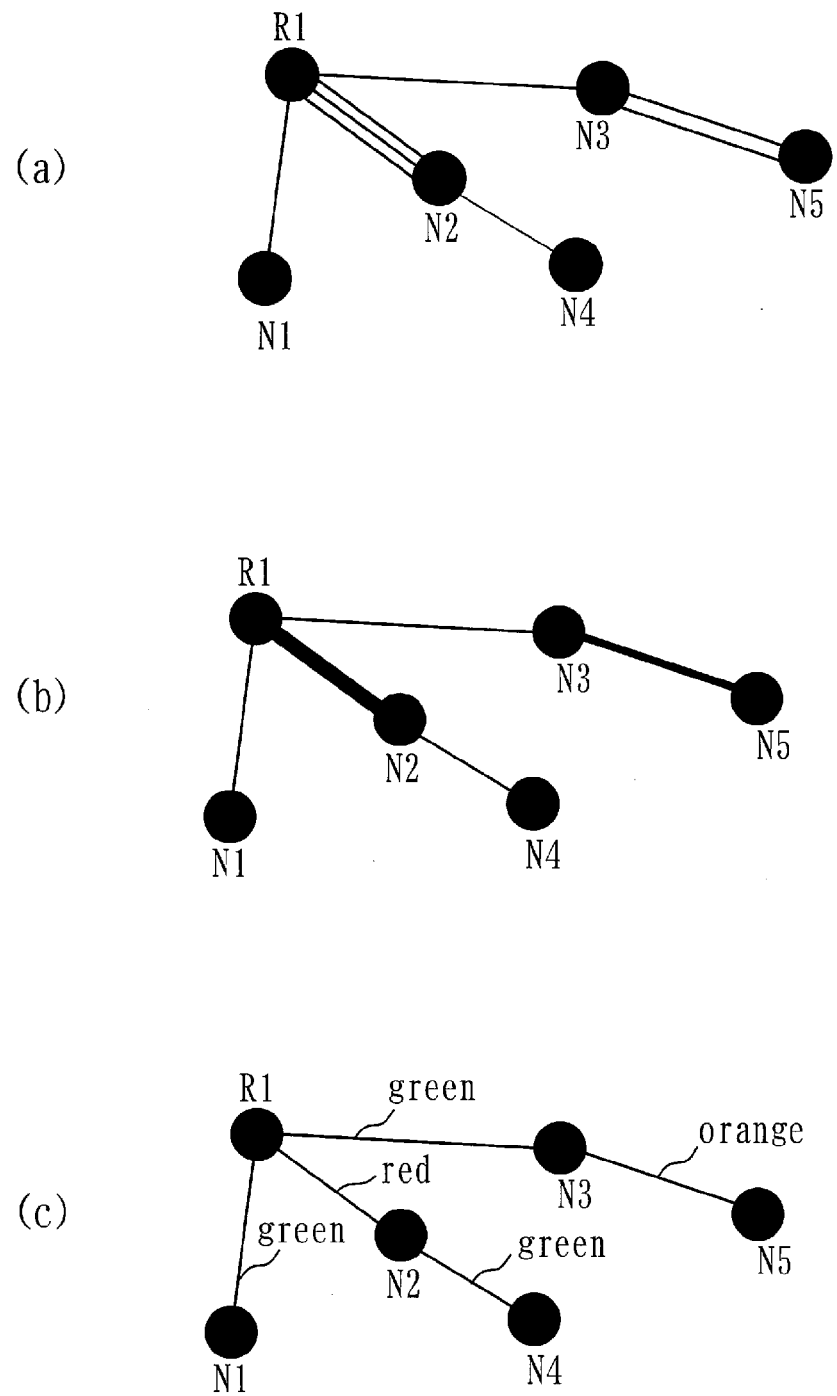
FIG. 10 is a diagram illustrating an example of display in a display unit according to the third embodiment of the present invention.

FIG. 10 is a diagram illustrating an example of display in the display unit according to the third embodiment of the present invention. FIG. 10 illustrates examples where the display of each path is differentiated according to the communication quality in the configuration of the network corresponding to (a) of FIG. 8 in the second embodiment above.

(a) of FIG. 10 illustrates an example where the display is performed by changing the number of lines according to the communication quality. (b) of FIG. 10 illustrates an example where the display is performed by changing the thickness of each line according to the communication quality. (c) of FIG. 10 illustrates an example where the display is performed by changing the color of each line according to the communication quality. Note, however, that since (c) of FIG. 10 is illustrated using black lines, color names are indicated for the purpose of explaining the solid lines. If the solid lines are color-coded in the implementation of the wireless characteristic display apparatus 100, the color names need not be displayed.

As described above, the wireless characteristic display apparatus of this embodiment provides substantially the same effects as those of the first embodiment above.

Moreover, the communication quality can be displayed with regard to each pair of wireless nodes, and this has the effect of being able to predict, at the time of designing a network, a communication error rate and a communication path that may become a bottleneck.

When the display is performed as illustrated in (a) of FIG. 10 and (b) of FIG. 10, this has the effect of being able to improve visibility compared with the color-coded display as illustrated in (c) of FIG. 10 (such as, for example, when the user of the wireless characteristic display apparatus 100 has a color vision deficiency).

With regard to substantially the same configuration and operation as those of the first embodiment above, modifications that are substantially the same as the various modifications described in the first embodiment above can be applied.

In this embodiment, it has been described that the information on the wireless communication path that may be used as a communication path of a multihop wireless mesh network is output from the fourth determination unit to the fifth determination unit 305. The wireless characteristic display apparatus 100 may be configured such that information on a pair that can constitute a multihop wireless network is output to the fifth determination unit 305, in place of the information on the communication path. In this case, the fifth determination unit 305 determines the communication quality using the information on the pair that can constitute a multihop wireless network, in place of the information on the communication path.

Fourth Embodiment

A fourth embodiment of the present invention will be described hereinafter with reference to FIG. 11 and FIG. 12.

With regard to the same or substantially the same components as the components of the embodiments above, description thereof may be omitted.

Figure 11:
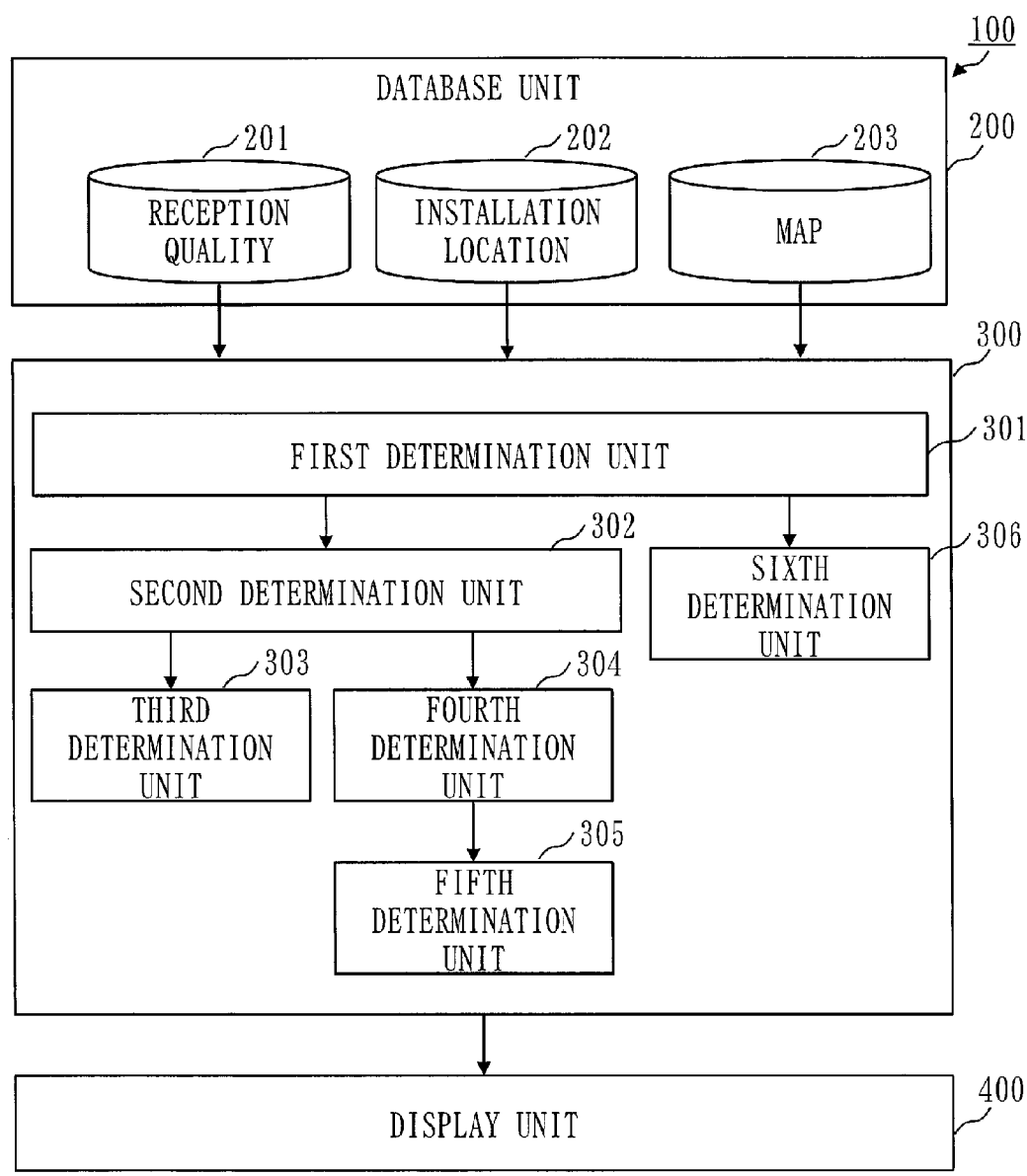
FIG. 11 is a diagram illustrating an overview of an internal configuration of a wireless characteristic display apparatus according to a fourth embodiment of the present invention.

FIG. 11 is a diagram illustrating an overview of an internal configuration of a wireless characteristic display apparatus according to the fourth embodiment of the present invention. In FIG. 11, 306 indicates a sixth determination unit. The rest of the components are substantially the same as those of the third embodiment above.

This embodiment differs from the third embodiment above mainly in that the sixth determination unit 306 is included.

A first determination unit 301 outputs information on reception qualities input from a reception quality database 201 and information on an estimated reception quality to the sixth determination unit 306.

The sixth determination unit 306 receives as input the information on reception qualities output from the first determination unit 301 and information on installation locations of wireless nodes stored in an installation location database 202. The sixth determination unit 306 determines, as a relay node installation recommended range, an overlapping range of the ranges in which the respective wireless nodes in the pair of wireless nodes can communicate, on the basis of the input reception qualities. The sixth determination unit 306 outputs the information on the determined relay node installation recommended range and the information on the installation locations of the wireless nodes to a display unit 400.

The display unit 400 receives as input the information on the relay node installation recommended range from the sixth determination unit 306. The display unit 400 displays the relay node installation recommended range.

The wireless characteristic display apparatus 100 may be configured such that the sixth determination unit 306 obtains the information on the installation locations of the wireless nodes through the first determination unit 301 and outputs the information on the installation locations of the wireless nodes to the display unit 400.

The communication range of each wireless node can be determined, for example, by setting a threshold for reception quality in substantially the same manner as that in the second embodiment above.

The rest of the operation is substantially the same as that in the third embodiment above, and thus description will be omitted.

Figure 12:
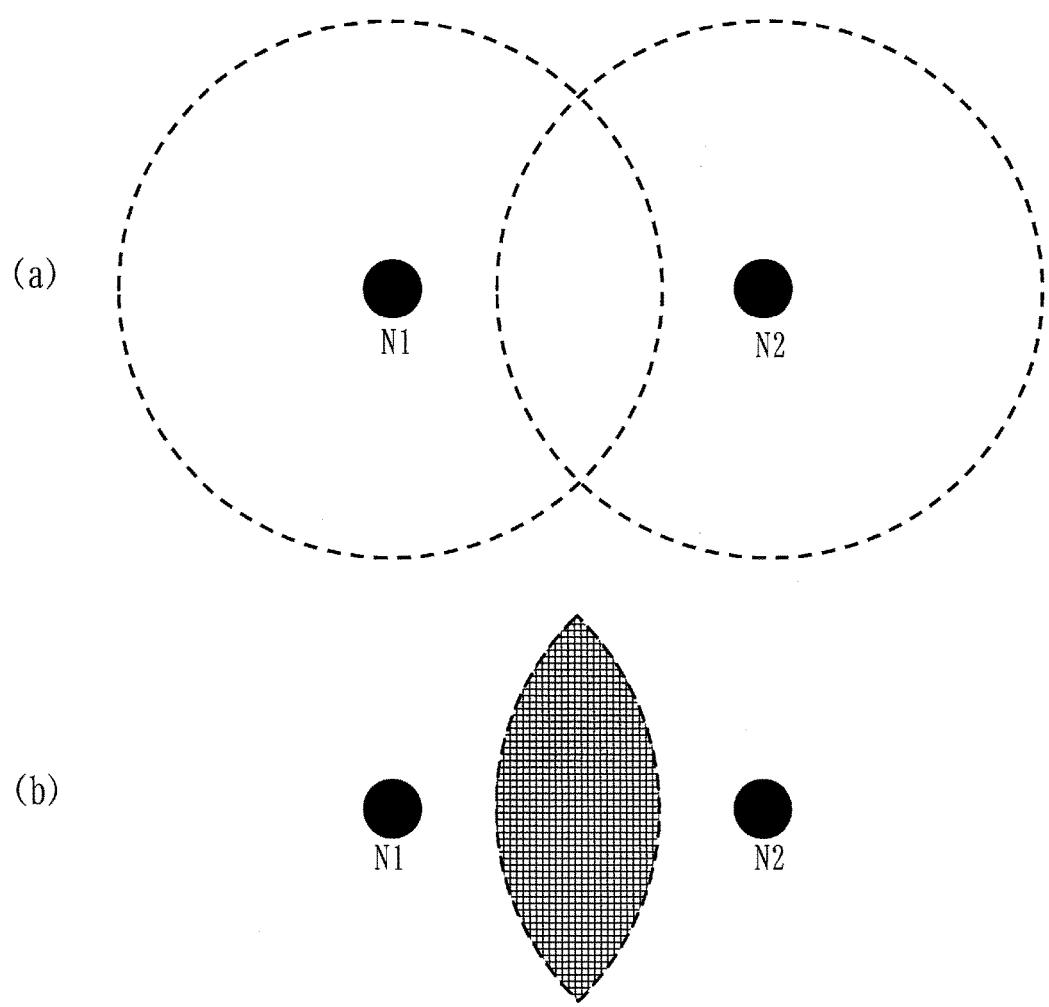
FIG. 12 is a diagram illustrating an example of display in a display unit according to the fourth embodiment of the present invention.

FIG. 12 is a diagram illustrating an example of display in the display unit according to the fourth embodiment of the present invention.

In FIGS. 12, N1 and N2 each indicate an identifier of a wireless node, a filled circle is an icon representing an installation location of a wireless node (a representative point) or representing a wireless node, a curved line (dashed line, blank inside) indicates a communication range of each wireless node, and a curved line (dashed line, shaded inside) indicates an overlapping area.

(a) of FIG. 12 illustrates an example where two wireless nodes and the communication range of each node are shown. For ease of understanding, the case in which the communication range of each wireless node is a simple circular range is used as the example. However, the communication range is not limited to a circular range. (b) of FIG. 12 illustrates an example where the two wireless nodes and the relay node installation recommended range that correspond to (a) of FIG. 12 are displayed as the display in the display unit.

As described above, the wireless characteristic display apparatus of this embodiment provides substantially the same effects as those of the third embodiment above.

Also provided is the effect of being able to display the relay node installation recommended range in order to allow communication with another wireless node if there is a wireless node that may not be able to communicate with another wireless node.

Moreover, the communication range of each individual wireless node is not displayed, and this has the effect of being able to facilitate visual perception of the recommended range if there are many wireless nodes or if wireless nodes are installed close together.

Moreover, the relay node installation recommended range is indicated, and this has the effect of improving the efficiency of network designing work.

With regard to substantially the same configuration and operation as those in the embodiments above, various modifications are possible in substantially the same manner as in the embodiments above.

In this embodiment, in (b) of FIG. 12, only the relay node installation recommended range is displayed as the display of communication ranges. However, various display formats can be selected in accordance with the implementation arrangement of the wireless display apparatus 100. Alternatively, for example, one or both of the following can be applied: (1) the communication range of each wireless node illustrated in (a) of FIG. 12 can be displayed additionally, and (2) the communication range of each wireless node illustrated in (a) of FIG. 12 can be displayed alternately with (b) of FIG. 12.

Fifth Embodiment

A fifth embodiment of the present invention will be described hereinafter with reference to FIG. 13 and FIG. 14.

With regard to the same or substantially the same components as the components of the embodiments above, description thereof may be omitted.

Figure 13:
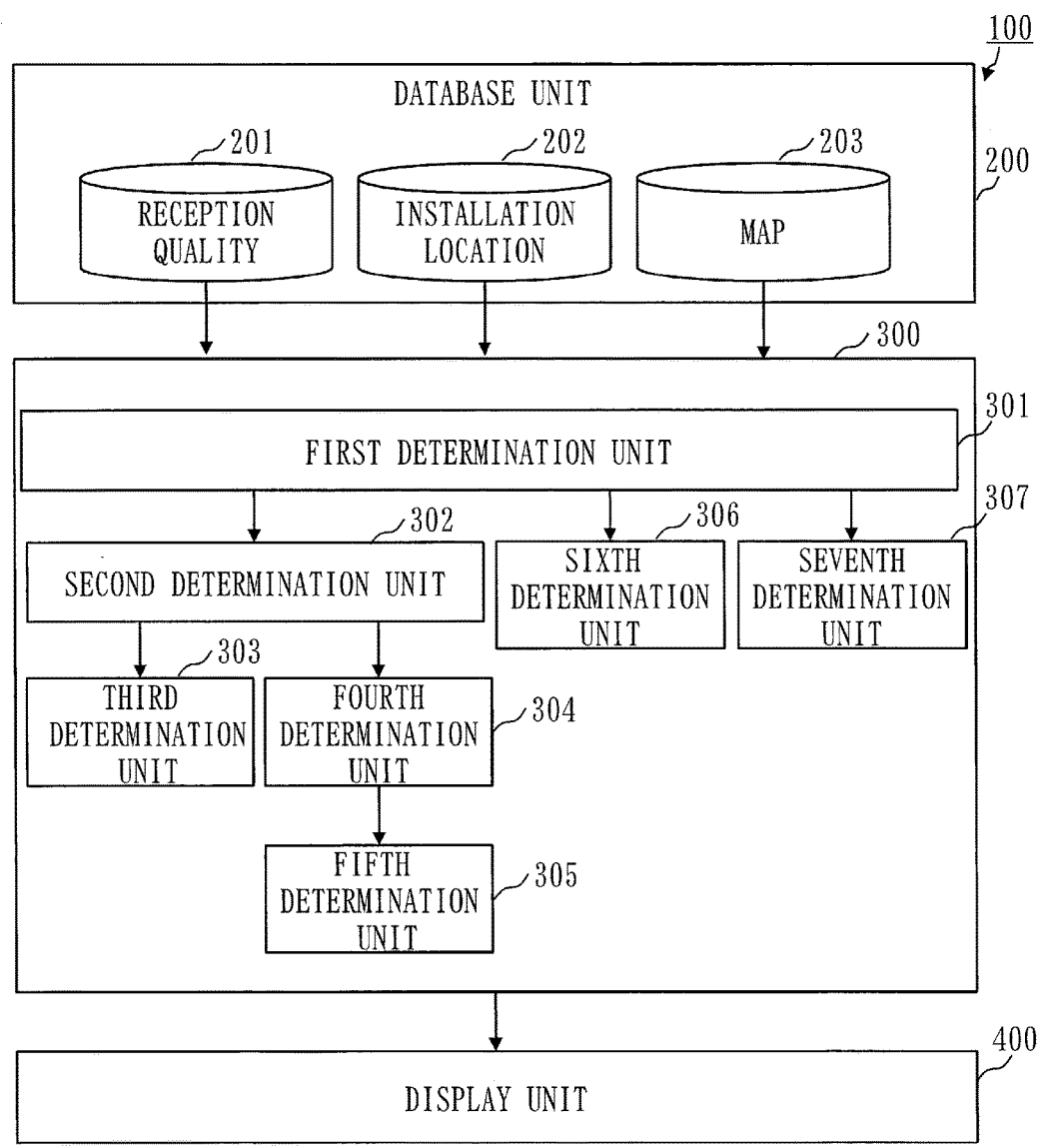
FIG. 13 is a diagram illustrating an overview of an internal configuration of a wireless characteristic display apparatus according to a fifth embodiment of the present invention.

FIG. 13 is a diagram illustrating an overview of an internal configuration of a wireless characteristic display apparatus according to the fifth embodiment of the present invention. In FIG. 13, 307 indicates a seventh determination unit. The rest of the configuration is substantially the same as that of the fourth embodiment.

This embodiment differs from the fourth embodiment above mainly in that the seventh determination unit 307 is included.

A first determination unit 301 outputs information on reception qualities input from a reception quality database 201 and information on an estimated reception quality to the seventh determination unit 307.

The seventh determination unit 307 receives as input the information on reception qualities output from the first determination unit 301 and information on installation locations of wireless nodes stored in an installation location database 202. The seventh determination unit 307 determines degrees to which communication ranges of wireless nodes overlap with one another and determines ranges with different degrees of overlapping, on the basis of the input reception qualities. In this embodiment, the number of wireless nodes sharing an overlapping communication range is used as a degree of overlapping. The seventh determination unit 307 outputs the information on the degrees of overlapping of communication ranges and the information on the ranges with different degrees of overlapping to the display unit 400.

The display unit 400 receives as input the information on the degrees of overlapping of communication ranges and the information on the ranges with different degrees of overlapping from the seventh determination unit 307. The display unit 400 displays each range with a different degree of overlapping in a different display format, and also displays the degree of overlapping in each range.

The rest of the operation is substantially the same as that in the fourth embodiment above, and thus description thereof will be omitted.

The communication range of each wireless node is determined, for example, by setting a threshold in substantially the same manner as in the first embodiment above.

Figure 14:
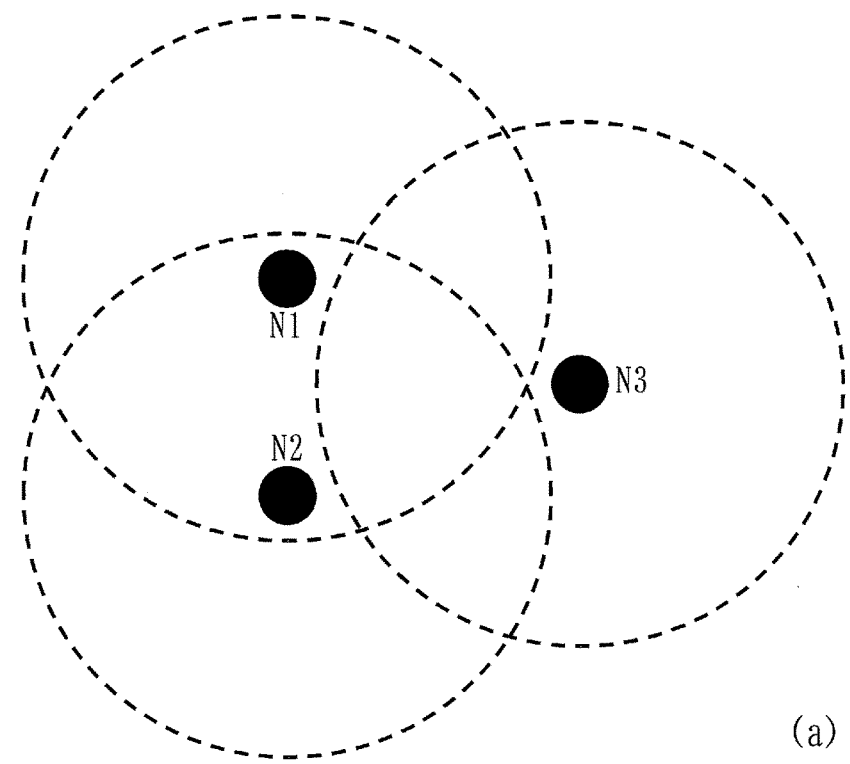
FIG. 14 is a diagram illustrating an example of display in a display unit according to the fifth embodiment of the present invention.
Figure 14:
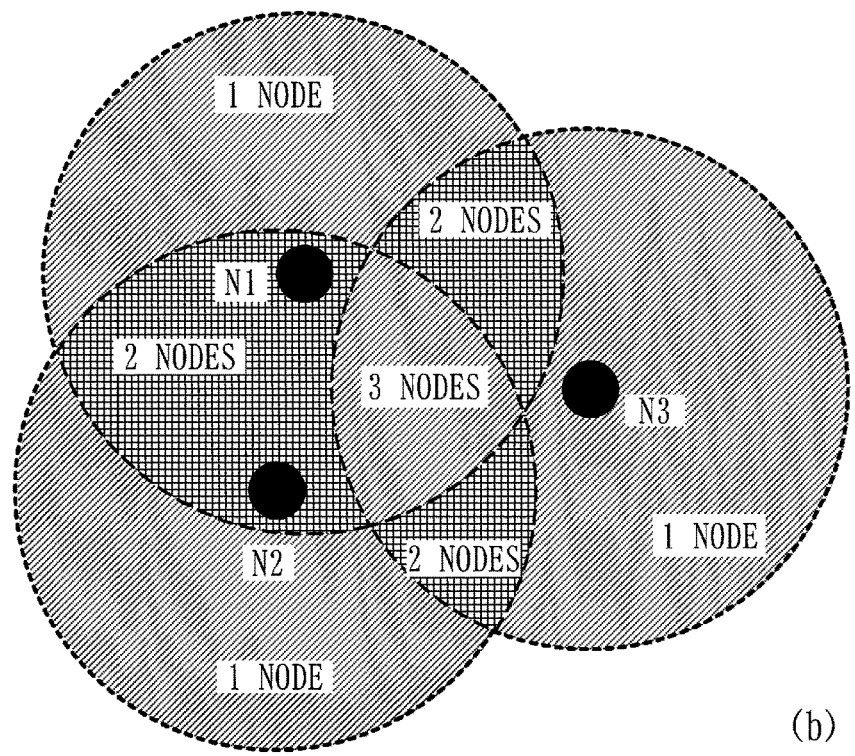

FIG. 14 is a diagram illustrating an example of display in the display unit according to the fifth embodiment of the present invention. FIG. 14 illustrates an example where all of the three wireless nodes N1 to N3 cannot perform bidirectional communication with the other wireless nodes, as an example of display with regard to a plurality of wireless nodes. Note, however, that the number of wireless nodes to be displayed is not limited to three.

In FIG. 14, N1 to N3 each indicate an identifier of a wireless node, a filled circle is an icon representing an installation location of a wireless node (a representative point) or representing a wireless node, a curved line (dashed line, blank inside) indicates a communication range of each wireless node, a curved line (dotted line, shaded inside) indicates an overlapping area of communication ranges, and "1 node" to "3 nodes" indicate degrees of overlapping.

(a) of FIG. 14 illustrates an example where three wireless nodes and the communication range of each wireless node are shown. For ease of understanding of the drawing, the case in which the communication range of each wireless node is a simple circular range is used as the example. The shape of each communication range may also be another shape or may also be different for each communication range, not being limited to a circular range. (b) of FIG. 14 illustrates, as the display in the display unit 400, an example of display where shading representation is used so that the ranges with different degrees of overlapping of communication ranges can be distinguished to correspond with (a) of FIG. 14. (b) of FIG. 14 illustrates an example where the installation locations (or icons) of the wireless nodes are also displayed, as in (b) of FIG. 12 in the fourth embodiment above. In (b) of FIG. 14, a different type of shading may be used for each degree of overlapping in accordance with the implementation arrangement.

It can be seen from (b) of FIG. 14 that there is a potential to add three new communication paths by installing a relay node within the range described as "3 nodes", for example.

As described above, the wireless characteristic display apparatus of this embodiment provides substantially the same effects as those of the embodiments above.

Moreover, in this embodiment, the apparatus is configured such that each overlapping range of ranges in which wireless nodes can communicate is displayed together with the degree of overlapping (the number of wireless nodes). In a multihop wireless mesh network, a diverted path for transfer may be created or set if a certain communication path becomes unusable. Thus, it can be stated that the network becomes stronger as the number of diverted paths increases. Therefore, the wireless characteristic display apparatus of this embodiment provides the effect of being able to easily check a range where a wireless node is to be installed additionally in order to increase the strength of the network.

Also in this embodiment, with regard to substantially the same configuration and operation as those in the embodiments above, various modifications that are substantially the same as those in the embodiments above are possible.

In this embodiment, the seventh determination unit 307 is provided as a separate unit. The wireless characteristic display apparatus may be configured such that the function of the seventh determination unit 307 is included in the first determination unit 301 (or the sixth determination unit 306) that has the function of determining a communication range, and results are output from the first determination unit 301 (or the sixth determination unit 306) to the display unit 400. The configuration is not limited to that of the drawing described above.

In FIG. 14 of this embodiment, black and white representation and shading representation are used. However, as long as a representation method allows differentiation such as, for example, using color representation in place of shading, various methods for representation can be applied. The representation is not limited to that of FIG. 14. The representation may vary depending on the implementation arrangement of the wireless characteristic display apparatus.

This embodiment has been described using the example where all of the first determination unit 301 to the seventh determination unit 307 are included. The wireless characteristic display apparatus 100 may be implemented independently of the sixth determination unit 306 and the seventh determination unit 307. The wireless characteristic display apparatus 100, in a narrow sense, not including one of these units may be configured.

Sixth Embodiment

A sixth embodiment of the present invention will be described hereinafter with reference to FIG. 15.

With regard to the same or substantially the same components as the components of the embodiments above, description thereof may be omitted.

Figure 15:
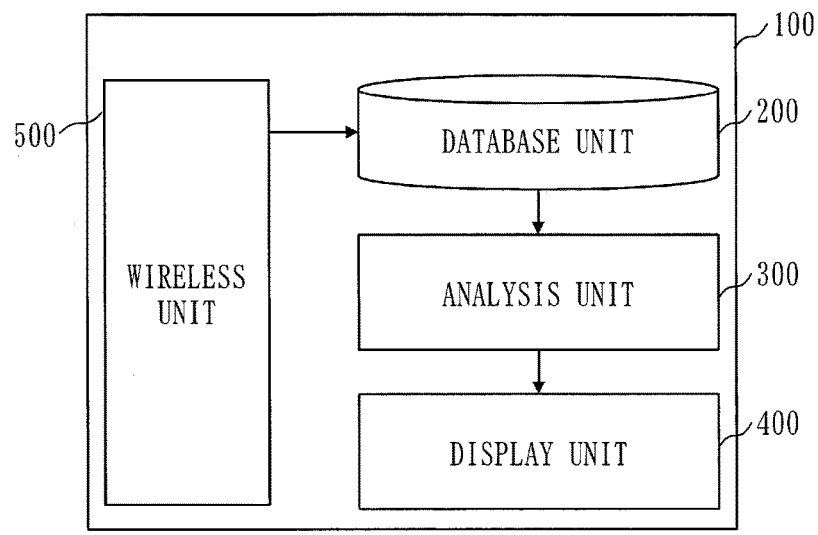
FIG. 15 is a diagram illustrating an overview of a wireless characteristic display apparatus according to a sixth embodiment of the present invention.

FIG. 15 is a diagram illustrating an overview of a wireless characteristic display apparatus according to the sixth embodiment of the present invention.

In FIG. 15, 500 indicates a wireless unit. The rest of the components are substantially the same as those in FIG. 1 of the first embodiment above. The internal configuration of the rest of the components may be any one of the configurations disclosed in the embodiments above.

This embodiment differs from FIG. 1 of the first embodiment above mainly in that the wireless unit 500 is included.

The wireless unit 500 receives a wireless transmission signal from a wireless node, measures a reception quality, and acquires information on the identifier of the wireless node for which the reception quality has been measured and information on the measurement location. The wireless unit 500 outputs the information on the measured reception quality and the information on the identifier of the wireless node to the reception quality database 201.

The reception quality database 201 receives as input the information on the reception quality, the information on the identifier of the wireless node, and the information on the measurement location from the wireless unit 500, and stores them as related information.

The information on the identifier of the wireless node commonly can be included as information included in the wireless transmission signal or can be determined on the basis of the information included in the wireless transmission signal. Therefore, it can be acquired by including the function of demodulating wireless transmission signals in the wireless characteristic display apparatus 100.

Various known and new wireless reception circuits can be applied as the implementation of the reception function in the wireless characteristic display apparatus 100, as long as it is configured to be able to receive a wireless transmission signal transmitted from a wireless node.

Various known and new methods and circuits can be applied as the implementation of the function of acquiring information on measurement locations in the wireless characteristic display apparatus 100. For example, the information can be acquired by including a GPS circuit.

The rest of the operation is substantially the same as that in one of the embodiments above, and thus description thereof will be omitted.

As described above, the wireless characteristic display apparatus of this embodiment provides substantially the same effects as those of the embodiments above.

Moreover, the wireless unit 500 is included, so that wireless characteristics can be displayed while reception qualities are being measured. This has the effect of improving the efficiency of work involved in creating a network, compared to when the wireless unit 500 is not included. When the validity of measurement and display results are tested, the wireless transmission signal can be received by a wireless characteristic display apparatus 100 that includes the same wireless unit 500, so that reception qualities that have been measured can be used as reference data. This has the effect of improving the accuracy of testing work.

With regard to substantially the same configuration and operation as those in the first embodiment above, modifications that are substantially the same as the various modifications described in the first embodiment above can be applied.

In this embodiment, the case in which reception is performed in the wireless unit 500 has been described. The wireless characteristic display apparatus may be configured in a broad sense, such that a transmission circuit is separately included to transmit a wireless signal, and the configuration is not limited to the case described above.

Methods for measuring received electric power include (1) what is known as a passive type in which data being transmitted by a wireless node for which measurement is performed is received and the received electric power is measured and (2) what is known as an active type in which communication is performed with a wireless node for which measurement is performed so as to measure the received electric power when data is received. The implementation arrangement of the wireless unit 500 of the wireless characteristic display apparatus 100 may be determined in accordance with the functions provided in wireless nodes that are assumed.

Seventh Embodiment

A seventh embodiment of the present invention will be described hereinafter with reference to FIG. 16.

With regard to the same or substantially the same operation as that in the embodiments above, description thereof may be omitted.

Figure 16:
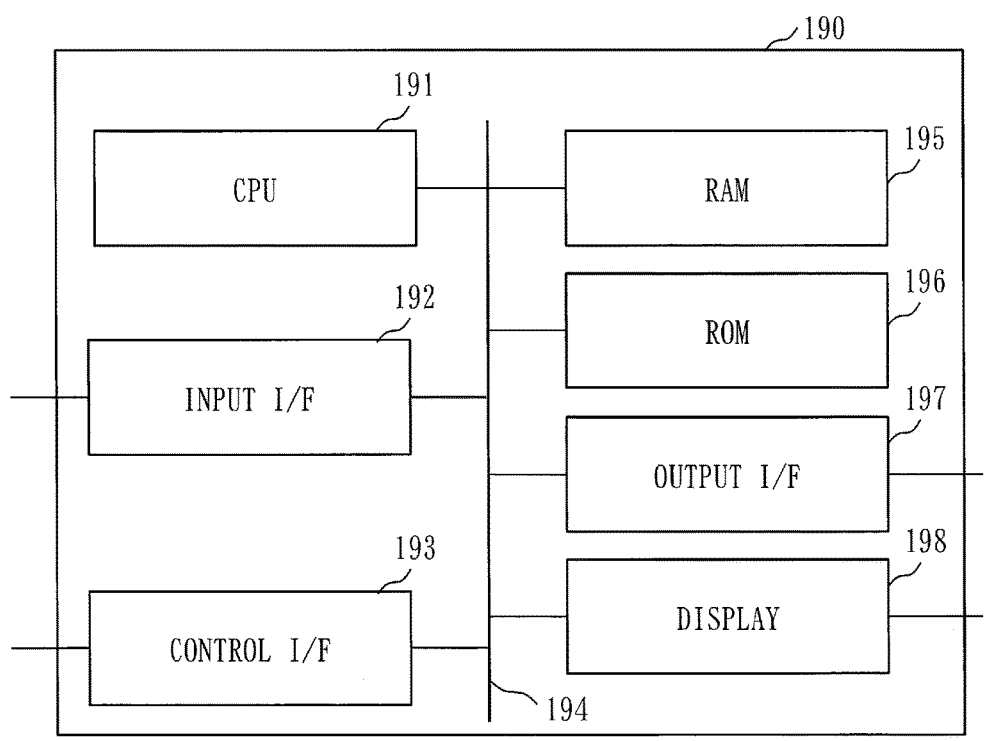
FIG. 16 is a diagram illustrating an overview of a wireless characteristic display apparatus according to a seventh embodiment of the present invention.

FIG. 16 is a diagram illustrating an overview of a wireless characteristic display apparatus according to the seventh embodiment of the present invention.

In FIG. 16, 191 indicates a CPU (Central Processing Unit), 192 indicates an input interface, 193 indicates a control interface, 194 indicates a bus, 195 indicates a RAM (Random Access Memory), 196 indicates a ROM (Read Only Memory), 197 indicates an output interface, and 198 indicates a display circuit.

It is also possible to define various types of the wireless characteristic display apparatus 100, in a broad sense, including a component not illustrated. For example, it is possible to define an apparatus including one or more of (1) a power supply function, (2) various control functions, (3) a communication function, (4) various interface functions, (5) various application processing functions, and (6) a display function.

The CPU 191 performs various processing such as, for example, one or more of (1) control processing, (2) arithmetic processing, and (3) determination processing.

The input interface 192 receives as input from the outside of the wireless characteristic display apparatus 100 at least one or more of (1) a signal, (2) information, (3) a program, and (4) information on a wireless node (an identifier, an installation location), for example.

The control interface 193 exchanges various types of control information with the outside of the wireless characteristic display apparatus 100 such as, for example, the user of the wireless characteristic display apparatus 100.

The bus 194 connects the blocks illustrated in the drawing, and is used for the exchange of one or more of various types of signals, data, and information. Note that the connection relations of the bus 194 are not limited to the connection relations illustrated in the drawing, and may be different depending on the implementation arrangement of the wireless characteristic display apparatus 100.

The RAM 195 and the ROM 196 store one or more of (1) various types of signal data, (2) various types of information, (3) temporary data being processed, and (4) a program, for example, that are required to be stored during the operation of the wireless characteristic display apparatus 100.

The output interface 197 outputs to the outside of the wireless characteristic display apparatus 100 one or more of (1) information on various results of analysis in the analysis unit 300, (2) information on various signals, and (3) a control signal for display, for example.

The display circuit 198 displays various results of analysis in the analysis unit 300. Note that the wireless characteristic display apparatus may be configured such that only a control circuit for display is included and display is performed on a screen of a general-purpose external display device.

In this embodiment, the components illustrated in FIG. 16 correspond to one or a plurality of the components illustrated in the drawings of the embodiments above.

For example, mainly the RAM 195 and the ROM 196 may correspond to the database unit 200.

For example, mainly the CPU 191, the RAM 195, and the ROM 196 may correspond to the analysis unit 300.

For example, mainly the CPU 191, the RAM 195, and the display circuit 198 may correspond to the display unit 400.

For example, mainly the input interface 192 and the output interface 197 may correspond to the wireless unit 500.

As described above, depending on which one of the embodiments above this embodiment corresponds to, the wireless characteristic display apparatus according to this embodiment provides the same or substantially the same effects as the effects described in the corresponding embodiment.

In the above description of this embodiment, the "CPU" is simply described as a CPU. However as long as it can realize various types of processing typified by determination processing, it may be (1) a microprocessor, (2) an FPGA (Field Programmable Gate Array), (3) an ASIC (Application Specific Integrated Circuit), (4) a DSP (Digital Signal Processor), (5) a PLD (Programmable Logic Device) typified by an FPGA (Field-Programmable Gate Array) or it may be a combination of some of these options, for example. It may be configured using a general-purpose device, a special-purpose device, or a combination of both, for example.

Although only one CPU 191 is depicted in the drawing, various implementation arrangements can be selected. For example, it may be configured such that (1) a plurality of CPUs are provided so as to process each of a plurality of processing functions, such as for example various types of control processing and image data arithmetic processing, with a different one of the CPUs, and (2) a plurality of CPUs cooperate to perform one processing. The same also applies to the rest of the components.

The implementation arrangement of each type of processing may be any one of (1) analog processing, (2) digital processing, and (3) analog and digital mixed processing. Moreover, (1) implementation by hardware, (2) implementation by software, (3) implementation by a mixture of both, or the like is possible.

In the above description, the "RAM" is described simply as a RAM. However, as long as it can store and hold data volatilely, it may be (1) an SRAM (Static RAM), (2) a DRAM (Dynamic RAM), (3) an SDRAM (Synchronous DRAM), (4) a DDR-SDRAM (Double Data Rate SDRAM), (5) an HDD (Hard Disk Drive), or (6) an SSD (Solid State Device), for example. Also note that the number thereof is not limited to one.

For the RAM 195, (1) implementation by hardware, (2) implementation by software, (3) implementation by a mixture of both, or the like can be selected.

In the above description, the "ROM" is described simply as a ROM. However, as long as it can store and hold data, it may be (1) an EPROM (Electrical Programmable ROM) or (2) an EEPROM (Electrically Erasable Programmable ROM), for example. Moreover, implementation by hardware, implementation by software, implementation by a mixture of both, or the like is possible.

With regard to the rest of the components in the drawing, (1) implementation by hardware, (2) implementation by software, (3) implementation by a combination of both, or the like can be selected.

The content of a signal and information carried by the bus 194 may vary depending on how the internal configuration of the wireless characteristic display apparatus 100 is divided. In that case, the signal and information may have different information attributes, such as (1) whether or not the implementation is explicit and (2) whether or not the information is specified explicitly.

The content of a signal, data, or information exchanged through a solid line and an arrow in the drawings of the embodiments above may vary in attribute, depending on how the internal configuration of the wireless characteristic display apparatus 100 is divided. In that case, the attribute may vary, such as (1) whether the implementation is explicit or the implementation is implicit, and (2) whether or not it is specified explicitly. Also note that a signal, data, and information other than those described in the embodiments above may be included.

For each type of processing or operation, various modifications are possible within the scope of the problems and effects of the present invention. Each type of processing or operation may be (1) implemented by being modified to substantially equivalent (or corresponding) processing (or operation), or (2) implemented by being divided into a plurality of substantially equivalent pieces of processing. Also, (3) processing which is common to a plurality of blocks may be implemented as processing of a block including these blocks, or (4) implemented collectively by one of the blocks.

How the configuration, functions, and processing of the apparatus are divided in the embodiments above is an example. In the implementation of the apparatus, as long as equivalent functions can be realized, the implementation of the apparatus is not limited to the embodiments.

REFERENCE SIGNS LIST

100: wireless characteristic display apparatus, 200: database unit, 201: reception quality database, 202: installation location database, 203: map information database, 300: analysis unit, 301: first determination unit, 302: second determination unit, 303: third determination unit, 304: fourth determination unit, 305: fifth determination unit, 306: sixth determination unit, 307: seventh determination unit, 400: display unit, 500: wireless unit, 191: CPU, 192: input interface, 193: control interface, 194: bus, 195: RAM, 196: ROM, 197: output interface, 198: display circuit, N1 to N4: (identifiers of) wireless nodes, #1 to #4: measurement locations, #x: location at which estimation is performed

The invention claimed is:

1. A wireless characteristic display apparatus comprising: processing circuitry to:
   perform interpolation processing using reception qualities of a wireless transmission signal from a same wireless node measured at a plurality of measurement locations, and determine a reception quality of the wireless transmission signal at a location other than the measurement locations;
   determine, on a basis of the determined reception quality of the wireless transmission signal at the location other than the measurement locations and information on installation locations of a plurality of wireless nodes, a pair of wireless nodes included in the plurality of wireless nodes and capable of bidirectional inter-node communication;
   determine a communication range sum of communication ranges of the wireless nodes constituting the determined pair of wireless nodes capable of bidirectional inter-node communication; and
   display installation locations of the wireless nodes constituting the determined pair of wireless nodes capable of bidirectional inter-node communication and the determined communication range sum.

2. The wireless characteristic display apparatus according to claim 1,
   wherein the reception quality at the location other than the measurement locations includes a reception quality at an installation location of at least one wireless node of the plurality of wireless nodes, and
   the processing circuitry determines the pair of wireless nodes capable of bidirectional inter-node communication, on a basis of the determined reception quality of the wireless transmission signal at the installation location of at least one wireless node.

3. The wireless characteristic display apparatus according to claim 1,
   wherein the interpolation processing performs processing to determine an average using weighting with respect to each of the reception qualities of the wireless transmission signal measured at the plurality of measurement locations, in accordance with a distance between the location other than the measurement locations and each of the plurality of measurement locations.

4. The wireless characteristic display apparatus according to claim 1,
   wherein the processing circuitry determines a pair capable of constituting a multihop wireless network, out of the determined pair of wireless nodes capable of bidirectional inter-node communication, and
   displays a configuration of a network constituted by the determined pair capable of constituting the multihop wireless network.

5. The wireless characteristic display apparatus according to claim 4,
   wherein the processing circuitry determines a communication quality of the bidirectional inter-node communication with respect to each determined pair capable of constituting the multihop wireless network, and
   displays the communication quality with respect to each determined pair of the wireless nodes when displaying the configuration of the network constituted by the determined pair capable of constituting the multihop wireless network.

6. The wireless characteristic display apparatus according to claim 1, wherein the processing circuitry determines an overlapping area of communication ranges of wireless nodes as a relay node installation recommended range, on a basis of the determined reception quality of the wireless transmission signal at the location other than the measurement locations and the information on the installation locations of the wireless nodes, and
   displays the determined relay node installation recommended range.

7. The wireless characteristic display according to claim 1,
   wherein the processing circuitry determines a degree of overlapping of communication ranges of wireless nodes and ranges with different degrees of overlapping, on a basis of the determined reception quality of the wireless transmission signal at the location other than the measurement locations, and
   displays the determined degree of overlapping of communication ranges of wireless nodes and the determined ranges with different degrees of overlapping.

8. The wireless characteristic display apparatus according to claim 1, wherein the processing circuitry receives the wireless transmission signal to be used and measure the reception qualities, and performs the interpolation processing using the measured reception qualities of the wireless transmission signal at the plurality of measurement locations, and determines the reception quality of the wireless transmission signal at the location other than the measurement locations.

9. A wireless characteristic display method comprising:

performing interpolation processing using reception qualities of a wireless transmission signal from a same wireless node measured at a plurality of measurement locations, and determining a reception quality of the wireless transmission signal at a location other than the measurement locations;

determining, on a basis of the determined reception quality of the wireless transmission signal at the location other than the measurement locations and information on installation locations of a plurality of wireless nodes, a pair of wireless nodes included in the plurality of wireless nodes and capable of bidirectional inter-node communication;

determining a communication range sum of communication ranges of the wireless nodes constituting the determined pair of wireless nodes capable of bidirectional inter-node communication; and displaying installation locations of the wireless nodes constituting the determined pair of wireless nodes capable of bidirectional inter-node communication and the determined communication range sum.

10. A non-transitory computer readable medium storing a program to be executed in a wireless characteristic display apparatus including a processing device and a storage device, the program being able to be stored in the storage device and causing the processing device to function as:

a first determination unit to perform interpolation processing using reception qualities of a wireless transmission signal from a same wireless node measured at a plurality of measurement locations, and determine a reception quality of the wireless transmission signal at a location other than the measurement locations;

a second determination unit to determine, on a basis of the reception quality of the wireless transmission signal at the location other than the measurement locations determined by the first determination unit and information on installation locations of a plurality of wireless nodes, a pair of wireless nodes included in the plurality of wireless nodes and capable of bidirectional inter-node communication;

a third determination unit to determine a communication range sum of communication ranges of the wireless nodes constituting the pair of wireless nodes capable of bidirectional inter-node communication determined by the second determination unit; and a display unit to display installation locations of the wireless nodes constituting the pair of wireless nodes capable of bidirectional inter-node communication determined by the second determination unit and the communication range sum determined by the third determination unit.

\* \* \* \* \*